Aug. 15, 1933.   M. STEENBECK ET AL   1,922,221
RESISTANCE MATERIAL
Filed July 18, 1930
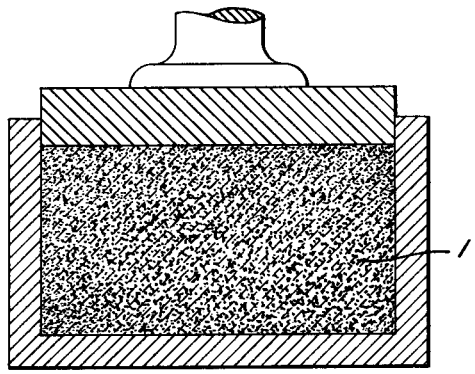
Fig. 1.
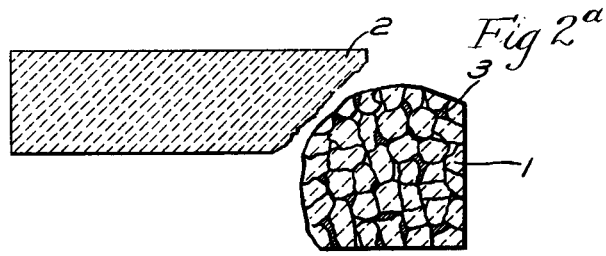
Fig. 2.   Fig. 2ᵃ
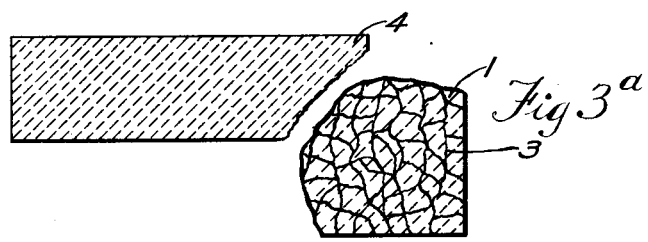
Fig. 3.   Fig. 3ᵃ
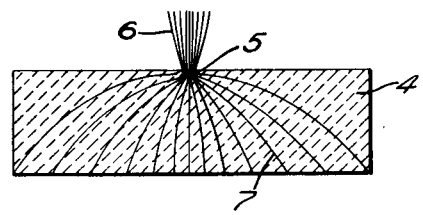
Fig. 4.
WITNESS
INVENTORS
Max Steenbeck, and
Rudolf G. Berthold.
BY
ATTORNEY Patented Aug. 15, 1933

1,922,221

UNITED STATES PATENT OFFICE 1,922,221

RESISTANCE MATERIAL

Max Steenbeck, Berlin-Westend, and Rudolf Gottfried Berthold, Berlin-Siemensstadt, Germany, assignors to Westinghouse Electric and Manufacturing Company, a Corporation of Pennsylvania Application July 18, 1930, Serial No. 468,808, and in Germany July 20, 1929

2 Claims. (Cl. 201—76)

Our invention relates to resistance materials, that is substances having a high specific resistance, and to methods of making them as well as to the application of such resistance materials in various branches of the electrical art.

Materials are already known with a fairly high specific resistance, these being made of clay and graphite (silite or substances of the nature of silite). Such a resistance material however is unserviceable for many purposes, as its resistance decreases considerably as the temperature increases. The present invention now aims at providing a resistance material whose specific electrical resistance does not diminish even at high temperatures.

A material of this kind may be used to advantage in all cases where the passage of an electric current from a solid or liquid conductor into a gaseous or vapour conductor may take place, but where this transfer must be prevented from taking place in the form of an electric arc or flash.

A high voltage drop does not occur in resistance material of the kind now known, in which the distribution of the lines of flow of the current is favourable to an arc discharge because at the high temperatures which the surface reaches owing to the heat energy, its resistance breaks down entirely. Thus it is possible for instance to use this resistance material having a specific resistance of about 5-100 ohms as a cathode and to cause an arc to strike from it. Therefore in cathode-drop surge arresters (autovalve arresters), flash-overs in the form of an arc discharge are quite possible.

The new resistance material should therefore have no negative temperature coefficients. Such materials are for example all the metals. However, as the conductivity of the metals is too great, they cannot be used as resistances in solid form. For this reason the new substance, which also contains metal, according to the invention is in the form of a very fine metallic sponge, the size of the pores corresponding approximately to the order of magnitude of the length of the mean free path of the air. In order to increase the mechanical and electrical strength, the pores of this sponge are filled up with insulating material.

According to the invention these resistance materials may be made by fusing together a mixture of metal dust and insulating material at high temperature and pressure or by melting glass powder which has been superficially metallized.

Further it is also possible to convert such materials into spongy form by pressing metals into a porous chemical mass, by filling up the pores of a ceramic mass with a metal by galvanic means or by chemical processes, by pressing a colloidal solution of metal into the pores of a ceramic mass and subsequently allowing the solvent to evaporate and finally by introducing colloidal metal into the pores of a ceramic mass by electro-osmotic methods etc.

The manufacture of substances of high specific resistance may take place for instance, in the following manner:

A mixture comprising about 50% zinc dust, and consisting of metallic zinc and zinc oxide, is heated at about 600 degrees C. at a pressure of 30-40 atm. along with about 50% fine sand to which a little sodium water glass may be added, until the metallic dust and the particles of insulation sinter together.

Another example for making the new resistance material is as follows:

Glass dust of uniform granulation (about $10^{-3}$ of a millimeter in diameter) is sintered at fairly low temperature so that a porous mass is produced. This mass is metallized according to one of the well-known glass silvering methods. A convenient method is to coat the glass with a composition consisting of 105 grams silver oxide, 45 grams lead borate, 80 grams glycerine and 60 grams methyl alcohol. After the glass is coated with this composition, it is heated up to a temperature below red heat, say about 500° to 600° C. to reduce the oxide. If not desired, the lead borate may be omitted. The metal film which covers the walls of all the pores, produces a conductive connection right through the material. Now the material is heated up to the melting point of the glass. This yields a dense glasshard fused body which has a resistance of the value stated.

The effectiveness of the new resistance material is due, first and foremost, to the fact that fine metallic particles cohering together are embedded between the parts consisting of insulating material. As a further example of how this may be brought about, this may be done by fusing together superficially metallized or silvered glass dust.

Such a material may further be prepared by a liquid metal or alloy being pressed into a mass consisting of a porous insulating material such as clay, under high pressure, for example 150 atmospheres. The filling up of the pores of ceramic masses by a metal may of course be brought about by galvanic means or by chemical deposits.

Further the metal may be introduced in colloidal solution into the pores of a ceramic mass, i. e. the metallic solution is allowed to be absorbed by the ceramic mass and the solvent is afterwards evaporated.

This may be done for example in the following manner:

A porous ceramic mass is impregnated with a solution of copper nitrate $Cu(NO_3)_2$ in water, then heated to about 450 degrees C. whereupon the copper nitrate decomposes into copper oxide, CuO. At about 500 degrees this copper oxide is reduced to metallic copper in a hydrogen atmosphere. This metallic copper fills up the pores of the ceramic mass like filling a sponge and thus forms a resistance material of the required properties.

The introduction of colloidal metals into the pores of a ceramic mass may also be accomplished by electro-osmotic methods, by allowing a metallic salt solution to percolate through a layer of clay and causing the metal to deposit therein. Thus copper may easily be precipitated from clay impregnated with copper sulphate by using a mercury cathode.

The new material may be used in switches of all kinds in which the passage of the electricity into air or gas is undesirable. Moreover the new substance may be applied to gaseous discharge apparatus operating with corona discharges (electric filters, cathode-drop surge arresters) in which a flash-over from the corona discharge into the arc or spark discharge may lead to the total or partial destruction of the apparatus, or at least reduce its efficiency. This new material has for instance a specific resistance of about 5–100 ohms, so that an arc cannot strike from it because for an arc to exist, there must be a high current density (arcing spot) at least at its cathode. The arrangement of the lines of flow which establishes itself at the electrode is shown in the accompanying drawing.

In the drawing

Fig. 1 indicates generally a mass 1 of inorganic particles being compressed to a porous body, Fig. 2, a conventional representation of the compressed body 2, but with a portion enlarged to illustrate the disposition of metal 3 on the surfaces and in the voids between the individual, inorganic patricles 1;

Fig. 3, a conventional representation of the completed sintered body 4, with a portion enlarged to show the inorganic particles 1 sintered together, with a reticulated structure of metallic conductor 3 interspersed with substantial uniformity between adjacent surfaces of the sintered particles; and in Fig. 4, 5 denotes the arcing spot, from a completed resistor 4, 6 the column of the arc and at 7 there is shown the distribution of the lines of flow of the current in the electrode. Figs. 2a and 3a are magnified fragments of Figs. 2 and 3, respectively.

In the immediate region of the arcing spot, only a very small cross-section of the cathode participates in the conducting of the current. The resistance which the arcing current meets in the electrode material, is in the main determined by the conductivity of the surface layer of the cathode, that is, the zone in which the lines of flow are powerfully concentrated. The resistance which the arc meets in the uppermost layer, for example a layer of 1 mm. which has a specific resistance of say 10 ohms, is still further increased by the resistance of the arc. This high total resistance does not permit arcing currents of any magnitude to occur when the circuit is broken or else it prevents the formation of any arc at all.

Of particular importance is the use of the new substance in connection with electric filters. In these, a glow or corona discharge is produced in atmospheric air between metallic electrodes, this corona discharge having the tendency to pass into an arc discharge by flashing over. If the electrodes are covered with the new resistance material even when applied in a very thin layer, a flash-over of sparks or the formation of an arc becomes impossible, because these two discharge forms necessitate a high current density at the electrodes, but such a current density cannot occur when the new resistance material is present, for the reasons stated. The resistance layer however offers no appreciable resistance to the corona discharge so that the voltage in the electric filter itself may be made much higher and its efficiency therefore considerably increased.

In cathode-drop surge arresters the maintaining of a corona discharge whilst avoiding the formation of an arc is likewise important. Therefore the use of the new material is quite called for in such apparatus. If the specific resistance in an air space of about 0.1 mm. between two discharge plates is 10 ohms per cm. a concentrated arc discharge requires a potential about 15 times greater than a distributed corona discharge, other conditions being equal. The potential for a corona discharge is independent of the intensity of current even right up to very high currents and the space voltage, i.e. the voltage drop across the gaseous space, remains perfectly constant as long as the cathode is not completely covered by the discharge. Since moreover the current density of this "normal" corona discharge must likewise remain constant the voltage drop in the resistance material also does not vary. Below a certain voltage it is not possible for the device to discharge at all. Immediately above this voltage, with a perfectly constant space voltage, high currents, say of 30 amps. per cm.² may be discharged. The apparatus when furnished with the new resistance material therefore fulfills all the conditions of an ideal surge arrester.

We claim as our invention

1. The method of producing a resistor which comprises sintering an inorganic non-metallic material at a low temperature to obtain a porous mass, forming a coating of metal over the internal and external surfaces of the porous mass of inorganic insulating material, and then heating the coated material up to the melting point of the inorganic material.

2. The method of producing a resistor which comprises sintering glass dust at a low temperature to produce a porous mass, coating the internal and external surfaces of the porous mass with a metal and then heating the coated glass to the melting point of the glass.

MAX STEENBECK.
RUDOLF GOTTFRIED BERTHOLD.